United States Patent [19]
Sekmakas

[11] 3,850,772
[45] Nov. 26, 1974

[54] ELECTRODEPOSITION OF ORGANOPOLYSILOXANE-CONTAINING COATINGS TO PROVIDE IMPROVED GLOSS AND WEATHER RESISTANCE

[75] Inventor: Kazys Sekmakas, Chicago, Ill.

[73] Assignee: DeSoto, Inc., Des Plaines, Ill.

[22] Filed: Aug. 27, 1971

[21] Appl. No.: 175,763

Related U.S. Application Data

[63] Continuation-in-part of Ser. No. 660,931, Aug. 16, 1967, , which is a continuation-in-part of Ser. Nos. 478,736, Aug. 10, 1965, abandoned, and Ser. No. 605,607, Dec. 29, 1966, Pat. No. 3,468,836.

[52] U.S. Cl. .............................................. 204/181
[51] Int. Cl. ........................................... B01k 5/02
[58] Field of Search .................................... 204/181

[56] References Cited
UNITED STATES PATENTS

| | | | |
|---|---|---|---|
| 2,865,795 | 12/1958 | Morrison | 204/181 |
| 3,450,655 | 6/1969 | Spiller | 204/181 |
| 3,650,998 | 3/1972 | Sekmakas et al. | 204/181 |

*Primary Examiner*—Howard S. Williams
*Attorney, Agent, or Firm*—Dressler, Goldsmith, Clement & Gordon, Ltd.

[57] ABSTRACT

Films of improved gloss and weather resistance are electrodeposited from an aqueous bath on the anode by passing a unidirectional electrical current through a bath having dispersed therein an aminoplast resin in admixture with a linear copolymer having an acid value of from 12–100 and an hydroxy value of at least 10 and having at least 1% of organopolysiloxane condensed therein. On baking, the organopolysiloxane content of the copolymer enhances the gloss and exterior durability of the electrodeposited film.

13 Claims, No Drawings

ELECTRODEPOSITION OF ORGANOPOLYSILOXANE-CONTAINING COATINGS TO PROVIDE IMPROVED GLOSS AND WEATHER RESISTANCE

The present application is a continuation-in-part of my prior application Ser No. 660,931, filed Aug. 16, 1967, which, in turn, is a continuation-in-part of my prior application Ser No. 478,736, filed Aug. 10, 1965, now abandoned, and Ser. No. 605,607, filed Dec. 29, 1966, now U.S. Pat. No. 3,468,836.

The present invention relates to the electrodeposition on the anode of a direct current electrical system of curable resins including organopolysiloxanes from an aqueous system in order to provide electrodeposited coatings of improved properties.

In accordance with the present invention, an organopolysiloxane having hydroxy or alkoxy functionality is condensed to form an ether connection between the siloxane and a hydrophilic resin which is dispersed in water with the assistance of a base. In this connection, and while preferred practice will be described hereinafter, the siloxane can be condensed with an hydroxy functional monomer which is later polymerized, or polymerization can be conducted first to provide an hydroxy functional addition copolymer and the condensation reaction with the polysiloxane effected thereafter. It will also be understood that the term "ether" is used even though the bond which is intended to be identified is the Si—O—C group.

It is desired to point out that organopolysiloxanes are normally hydrophobic materials which are highly antagonistic to water. The fact that these hydrophobic materials can be incorporated in significant proportion into hydrophilic resins which can be dispersed in water with the aid of a base is quite surprising. It is especially surprising to find that this can be achieved at minimum acid value to provide aqueous systems particularly adapted for electrocoating. However, and as a consequence of the presence of the siloxane component in the hydrophilic resin, the films which can be electrodeposited or otherwise applied are characterized by exceptional weather resistance. Moreover, and while the achievement of glossy films by electrodeposition is difficult, the siloxane-containing resins which are electrodeposited exhibit excellent gloss which appears to be at least in part a consequence of the siloxane content of the electrodeposited resin.

In order that the acrylic copolymer will be sufficiently hydrophilic, it is produced by solution copolymerization, water miscible organic solvents being used to facilitate water dispersibility. Of course, the copolymer cannot include large amounts of copolymerized monomer which are are strongly antagonistic to water, e.g., the major weight proportion of the copolymer is preferably constituted by $C_1 - C_4$ esters of acrylic acid, though smaller proportions of such esters may be used consistent with water dispersibility of the final resin with the aid of a base. Lastly, the copolymer is provided with residual hydroxy functionality to emphasize the hydrophilicity of the polymer molecules and to enhance cure.

Solution copolymerization is, per se, well known. In this known procedure, the monomers react in solvent solution to produce a soluble polymer, the presence of the solvent serving to limit the molecular weight of the product. It is not essential that molecular weight be further minimized in conventional fashion through the use of mercaptan or other known chain terminating agents or through the use of very elevated polymerization temperature, though this is preferred. Since the polymer is preferably to be dispersed in water with the further aid of a water miscible organic solvent, this solvent is normally selected as the solvent in which the copolymerization is conducted.

As is also well known, the solution copolymerization is usually conducted at reflux with a peroxy catalyst present to generate the free radicals needed for the addition polymerization reaction. While any free-radical generating polymerization catalyst may be used, the selection is usually based on the temperature of reaction. Suitable reaction conditions and catalysts are common knowledge in the field and are illustrated in the examples.

The particular nature of the organic solvent used for the solution copolymerization is not a critical aspect of the invention, although the water miscible organic solvents are preferred since, otherwise, the solvent used would have to be largely removed and replaced by more appropriate solvents before dispersion in water can be carried out. Appropriate water miscible solvents are dioxane, ethanol, isopropanol, 2-ethoxy ethanol, methyl ethyl ketone, 2-ethoxy ethanol acetate, propyl alcohol, butoxy ethanol, 2-ethoxy diethylene glycol, 2-butoxy diethylene glycol, etc.

The hydroxy functionality of the addition copolymer can be provided by the direct reaction of an hydroxy functional monomer or, as in the preferred practice of the invention, a portion of the hydroxy functionality is provided by polymerizing carboxy functional monomers and then reacting the carboxy copolymer with a monoepoxide to form an hydroxy ester.

When the hydroxy group is provided by copolymerization of hydroxy-containing monomer, the preferred monomers are 2-hydroxy ethyl acrylate and glycerol mono allyl ether, though these are merely illustrative of the class which also includes other hydroxy alkyl acrylates such as 2-hydroxy propyl acrylate, 4-hydroxy butyl acrylate and, less desirably the corresponding methacrylates.

Still further hydroxy-containing monomers which may be used are ethylene glycol allyl ether, propylene glycol allyl ether, butylene glycol allyl ether, diethylene glycol allyl ether, trimethylol propane allyl ether and 2-hydroxy-methyl-5-norbornene (either the endo isomer or the exo isomer or mixtures thereof). Still further, allyl alcohol, methallyl alcohol, crotyl alcohol and unsaturated fatty alcohols corresponding to drying oil fatty acids may be used. Hydroxy ethyl acrylate is preferred and will be used as illustrative. It is also preferred to supplement the hydroxy functionality by reaction of copolymer acidity with monoepoxide, and this will also be illustrated.

From the standpoint of proportions, the copolymer should contain from about 3–30%, preferably from 5–15% of the hydroxyl supplying component, based on the weight of the copolymer. Where the hydroxy group is generated by an in situ reaction, one can still calculate the amount of the corresponding ethylenically unsaturated monomer which would provide the same hydroxyl content. Stated differently, the rinal resin product containing the siloxane condensed therein should possess an hydroxy functionality of at least 10, preferably at least 15. In particularly preferred practice, the hydroxy value is 30 or higher. Hydroxy values in excess of about 200 are not preferred since the cross-link density becomes less favorable and the expense of providing the higher hydroxy functionality is not justified, but the technical result remains satisfactory.

In the preferred practice of the invention, the hydroxyl groups are generated is situ by the reaction of copolymer formed by copolymerization of monomers including an unsaturated carboxylic acid and an epoxide, especially a monoepoxide. Hydroxyl groups so generated are generally placed in more accessible positions that allow the greatest solubilizing effect. It may also be observed that the production of hydroxy-functional monomers is expensive because it is complicated by the need to minimize polymerization and to avoid formation of polyunsaturated diesters and for appropriate purification. These problems are largely avoided by reacting monoepoxide with preformed carboxy-functional polymer.

Any monoethylenically unsaturated carboxylic acid can be used in accordance with the invention including aliphatic or aromatic mono - or polycarboxylic acids. Preferred examples include acrylic acid, methacrylic acid, and crotonic acid. Other acidic monomers which may be used are monoethyl maleate, itaconic acid, maleic acid, fumaric acid and the like.

When the acid number is to be reduced by subsequent reaction with monoepoxide to provide an hydroxy ester, the unsaturated acid component is incorporated in an amount of from 3 to 50% and most preferably from 5 to 30% by weight, based on the total weight of the interpolymer. When the hydroxy functionality of the copolymer is provided wholly by hydroxy-functional monomers, the unsaturated acid need only be incorporated in an amount sufficient to provide the required acid number in the final interpolymer.

The particular monoepoxide which is selected is of secondary significance and, broadly speaking, any monoepoxide having a single oxirane group as the sole functional group thereof may be used. The preferred monoepoxides are the $C_1$–$C_4$ monoepoxide such as ethylene oxide, propylene oxide, and butylene oxide. The low molecular weight aliphatic compounds are superior from the standpoint of water solubility. However, styrene oxide can be used although it is less preferred. Also, higher molecular weight monoepoxides can be used, but these are, again, less preferred. Halogenated monoepoxides such as epichlorohydrin are fully useful and, indeed, advantageous for certain utilities. The halogen atom is non-reactive in the system, though it can usefully serve to enhance the fire resistance of coatings containing the same. Alpha-branched saturated monocarboxylic acids and tertiary fatty acids in the form of a glycidyl ester are quite good and have been found to be of unique value in providing reactive hydroxy esters which are fully compatible with water and which help to provide desirable physical properties in the final resin product. The glycidyl ester of Versatic acid, a tertiary monocarboxylic acid, is identified as tertiary glycidyl ester A and is used in some of the examples hereinafter. While polyepoxides can be used, e.g., diepoxides, the proportion of use of such polyfunctional materials should be minimized to avoid cross-linking the system.

The epoxide must be used in stoichiometrid deficiency with respect to the acid in order to form stable epoxy-free compositions which possess a residual acidity easily identified by the acid number of the product. The acid number is determined by titration with base, e.g., sodium hydroxide.

Preferably, the epoxide is used in a stoichiometric deficiency of at least 5%, preferably in a deficiency of from 50 to 90%. Stated in an opposite manner, one prefers to use the epoxy component in an amount sufficient to esterify (as by the formation of hydroxy ester groups) from 10 to 50% of the carboxyl groups which are available for esterification. The consumption of these carboxyl groups can be easily followed by observing the acid number of the product as it is reduced.

With respect to the production of the resins which are utilized in the invention, it is important that these include significant hydroxy functionality in order to enhance reactivity and capacity for dispersion in water with the aid of amine or other base despite the presence of the siloxane component and, preferably also, the use of only small amounts of acid in the polymer. For this purpose, and since epoxides are reactive with both hydroxy groups and carboxylic acid groups, it is important that the epoxide reaction be conducted preferentially so as to consume the excess acidity which is particularly undesired for electrocoating utility without impairing the hydroxy functionality which is desired. This selective reaction is achieved through the utilization of an alkaline esterification catalyst. Preferred catalysts are tertiary amines such as triethyl amine and quaternary ammonium salts such as trimethyl benzyl ammonium chloride. These alkaline materials are reactive with the acid groups of the polymer and appear to remain associated as salts with the residual carboxyl functionality of the resin.

The reaction is desirably carried out at moderately elevated temperatures in solution in a water miscible organic solvent. While complete water miscibility is not required, some extensive miscibility is needed, e.g., considerably in excess of the very limited miscibility of butyl alcohol in water. Appropriate water miscible organic solvents are the same as those noted previously in connection with the solvent solution copolymerization. All of these are excellent solvents for hydroxy-functional resins, alcohols being preferred from the standpoint of solubility. On the other hand, it is desired to point out that methyl ethyl ketone is an excellent solvent for resins and it does possess sufficient solubility in water to be used so long as the proportion of ketone does not exceed its solubility in the electrodeposition bath. Moreover, methyl ethyl ketone has valuable properties and is helpful when high voltages are contemplated.

For electrocoating application, large proportions of water miscible solvents are particularly desirable as will later be discussed more fully. However, even small amounts of water miscible solvents assist in solubilizing the resins of the invention for general purpose coating application.

The acid value may be up to about 100. While acid values in excess of 100 are least preferred, they may be tolerated. Maximum acid value is desirably less than 70 and preferably less than 50.

When the resins are to be applied by electrocoating, the acid value is preferably minimized so as to provide a less conductive deposit which enables the production of thinner films. Accordingly, the preferred resins for electrocoating have an acid value less than 30. In some instances adequate dispersion in water can be achieved using an acid value as low as 8. The especially preferred materials are those having an acid value of from 12 to 25. Of course, the resin solids content in the electrocoating bath is much smaller than in a general purpose aqueous coating composition.

The major weight proportion of the copolymer consists of monomers containing a single

group in order to provide a copolymer which is essentially linear. It is preferred to employ a copolymer which is largely acrylic since other resinous materials which may include hydroxy functionality, such as alkyd resins, do not possess properties adequate to provide the outstanding resistance to the elements which is desired in accordance with the invention. Nonetheless, appropriate ethylenically unsaturated polyester resins may be used to bring the siloxane component into the copolymer structure, but the bulk of the polymer is still preferably acrylic. Moreover, and in particularly preferred practice, at least 50% of the copolymer is preferably constituted by $C_1 - C_4$ esters of acrylic acid. The smaller the chain length of the ester groups, the larger is the proportion of the ester which is desirably present. In some instances, as little as 20% of $C_1 - C_4$ esters of acrylic acid is enough to enable the desired water dispersibility.

While the bulk of the polymer should be constituted by monomers which are not antagonistic to water and which contain a single

group, it is not essential to exclude vinyl aromatic compounds such as styrene, though the proportion of such water insoluble compounds should be minimized. Similarly, long chain esters of various unsaturated acids may be used if their proportion is minimized, though short chain esters such as diethyl fumarate, dimethyl maleate or ethyl crotonate can be used in somewhat larger proportions.

With the exception of ethylenic unsaturation, the copolymer functionality will preferably consist essentially of hydroxy functionality and carboxyl functionality, though N-alkoxy groups or amide groups are not unduly detrimental.

While N-methylol acrylamide and the like may be present, the presence of monomers of this type is not preferred since better cure and better properties are obtained when an external aminoplast resin is used for the cure. A feature of the invention is the simultaneous electrophoretic deposition of aminoplast resin with the hydroxy functional hydrophilic resins of the invention. In this regard, the normally hydrophobic siloxane component does not dominate the characteristics of the copolymer which are instead dominated by the acrylic structure, the hydroxy groups and the presence of water miscible organic solvent in order to provide an overall hydrophilic characteristic which is compatible with certain water insoluble aminoplast resins to be described hereinafter.

Broadly speaking, the silicon-containing material which is to be condensed with the hydroxy functional compounds or copolymers may be hydroxy functional or alkoxy functional as indicated hereinbefore, these two classes of materials being similar from many standpoints. Thus, the silicon-containing material should contain an average of at least 1.2 silicon OH or alkoxy groups per molecule, and the functionality of the material is preferbly higher. While thre is broadly no upper limit to the number of silicon OH or alkoxy groups per molecule, aspects of availability generally limit the functionality to a preferred value up to 10. On the other hand, there are important aspects of non-equivalence since the fastest curing materials are the higher functional materials and the alkoxy group is helpful in enabling silicon-containing materials of the highest functionality to be fully incorporated by condensation without gelation. Accordingly, the OH-terminated materials and the alkoxy-terminated materials will be separately described, the OH-terminated materials being conveniently referred to as polysilanols.

The polysilanol component which is reacted with the hydroxy functional copolymer is a silicon-containing compound containing an average of at least 1.2 silicon OH groups per molecule, preferably about 2 silicon OH groups per molecule. The term silicon OH groups identifies compounds in which the OH groups are attached directly to silicon as in compounds of the formulae:

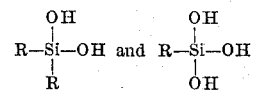

wherein R is an organic radical and preferably a hydrocarbon radical, such as an alkyl, alkenyl, cycloalkyl, aryl, alkaryl or aralkyl radical. These silanols are exemplified by diphenyldihydroxysilane, dicyclohexyldihydroxysilane, phenyltolydihydroxysilane, xylytrihydroxysilane, phenyltrihydroxysilane, octyltrihydroxysilane, vinyltrihydroxysilane, dimethyloctadecylhydroxysilane, myricyltrihydroxysilane, benzyldimethyldihydroxysilane, 3,3,3-trifluoropropylmethyldihydroxysilane, dibromophenylmethyldihydroxysilane, and chlorophenyltrihydroxysilane.

Another group of compounds containing a plurality of silicon OH groups are the siloxanols, i.e., compounds of the formula:

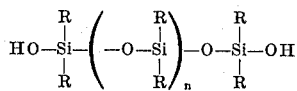

wherein R is an organic radical and preferably a hydrocarbon radical such as an alkyl, alkenyl, cycloalkyl, aryl, alkaryl, aralkyl radical, and $n$ is an integer from 0 to as high as 60 or more. Such materials may be exemplified by tetramethyldisiloxanediol

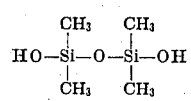

tetraphenyldisiloxanediol, tetraxylyldisiloxanediol, hexacyclohexyltrisiloxanediol, octaoctyltetrasiloxanediol, diphenyldimethyldisiloxanediol, dibutyldiethyldisiloxanediol and the like. Preferred members of this group comprise the organopolysiloxanediols, and particularly the polyalkylpolysiloxanediols, the polyarylpolysiloxanediols and the polycycloalkylpolysiloxanediols, which preferably contain no more than 12 carbon atoms in each aryl, alkyl or cycloalkyl radical.

Siloxanols which contain a plurality of silicon-bonded hydroxyl groups may be prepared by condensing one or more silanols. As is known, diorganosilanols condense to form entirely linear siloxanols, while monoorganosilanols form highly branched siloxanols. Mixtures of diorganosilanols and monoorganosilanols condense to form siloxanols having branching characteristics which lie between the above two extremes.

Another group of compounds containing a plurality of silicon OH groups are those having two or more silicon atoms bound together through divalent organic radicals, such as those of the formula:

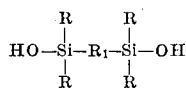

wherein R is another OH group or a hydrocarbon radical, preferably an alkyl, alkenyl, cycloalkyl, aryl, alkaryl, or aralkyl radical, and $R_1$ is a divalent organic radical, such as methylene or polymethylene radical, arylene or polyarylene radical, cycloalkylene or polycycloalkylene radical, or aralkylene or polyaralkylene radicals, or oxy - or thio-substituted derivatives of the foregoing members. Examples of this group include, among others, ethylene bis(trihydroxysilane), p-phenylene-bis(dimethylhydroxysilane), p-cyclohexylene-bis(dibutylhydroxysilane), 1,6-hexamethylene-bis (dimethylhydroxysilane), and 1,5-pentamethylene-bis(dibutylhydroxysilane). Particularly preferred members of this group comprise the alkylene-bis(dihydrocarbylhydroxysilanes), the arylene-bis(dihydrocarbylhydroxysilanes), and the cycloalkylene bis(dihydrocarbylhydroxysilanes). The preparation of many of these preferred silicon-containing compounds is illustrated in U.S. Pat. No. 2,561,429.

Still another group of compounds containing a plurality of silicon OH groups are the hydroxy-containing esters obtained by reacting any of the above-described silicon-containing polyhydric alcohols with mono- or polycarboxylic acids so that at least one of the OH groups remains unesterified. Preferred members of this group comprise those of the formula:

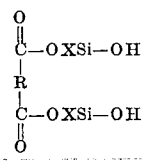

wherein R is a residue of polycarboxylic acids, such as phthalic acid, maleic acid, adipic acid, terephthalic acid, and the like, and X is the residue of the silicon-containing polyhydric alcohol as described above.

Referring to preferred polysilanols, it is pointed out that organo silanes hydrolyze to form organo silanetriols, for example:

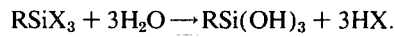

The hydrolysis is prompted by the use of mineral acids as catalysts and by heating up to 100°C. The organo silanetriols thus formed polymerize by condensation either spontaneously or by further heating up to 180°C., to form a polyorgano-siloxane having the structural unit:

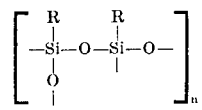

in which n denotes the average number of recurring groups in the resinous molecule.

As another embodiment of the invention, an intermediate is formed by stopping the condensation reaction before completion as by cooling or neutralization. The resinous intermediate so formed has the following average structural formula in which R'' indicates an organic group, which is desirably alkyl or aryl, but preferably phenyl:

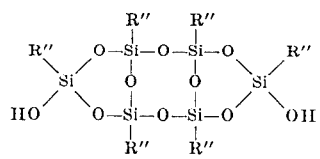

The specific hydroxy silicone resinous material having substantially the above structure in which R'' is phenyl and which is hereinafter referred to as disilanol "A" has the following physical characteristics:

| | |
|---|---|
| Hydroxy Content | 3.9% |
| Average Molecular Weight | 1,600 |
| Combining Weight (grams providing 1 gram mol of OH functionality) | 400 |

It should be noted that the disilanol A is self-evidently a material having an hydroxy functionality higher than 2 and a molecular weight higher than shown by the idealized formula. However, the term "disilanol" identifies the idealized structure and the ring opening or self-condensation which occurs in commerce accounts for the variation from the theoretical in molecular weight and hydroxy functionality. Also, and since combining weight is determined by esterification at elevated temperature with an organic acid (which leads to further ring opening and self-condensation), the combining weight does not necessarily compare exactly with the hydroxy content. Also, commercial products of the type noted above are available with an average molecular weight of 1200 and a combining weight of 425 and with hydroxy values of from 4—5%.

From the standpoint of alkoxy-functional materials, these may broadly correspond to any of the hydroxy functional materials which have been referred to hereinbefore, it being merely necessary to etherify the OH group with an alcohol such as methyl or ethyl alcohol in order to generate the alkoxy group. On this basis, it will be understood that alkoxy derivatives which correspond to each of the OH-terminated materials referred to previously can be utilized, and the etherification can be complete or partial so that the final silicon-containing compound may include mixtures of alkoxy groups and OH groups. However, when the compositions are later baked, the alcohol etherifying agent is eliminated which effectively regenerates the OH groups in situ. Moreover, and in a condensation reaction, it is possible to liberate alcohol more smoothly and controllably than water, and, for this reason, the alkoxy groups is preferred when the higher functional silicon-containing materials are employed.

Methyl alcohol is more easily removed than the higher alcohols and, accordingly, the methoxy group is preferred to the ethoxy group. Similarly, the ethoxy group is preferred to the propoxy or butoxy groups, though all of these are useful as are other etherifying alcohols and ether alcohols such as 2-ethoxy ethanol and 2-butoxy ethanol. It is also possible for long chain alcohols to interfere with water dispersibility. Accordingly, the most preferred alcohols are methyl and ethyl alcohols and alcohols containing up to 4 carbon atoms and ether alcohols containing up to 6 carbon atoms are superior to those of greater chain length and which are less volatile and more strongly hydrophobic.

The preferred silicon-containing materials are polysiloxanes, and it will be understood that both alkxoy and OH-containing polysiloxanes can be made in a similar fashion, e.g., by hydrolyzing an alkoxysilane such as phenyltriethoxysilane or dimethyldimethoxysilane.

Since the removal of water and alcohol can proceed at the same time, the hydrolysis of alkoxy silanes can produce siloxanes which contain both hydroxy and alkoxy functionality and polymeric alkoxy silane hydrolysates are avialable with detectable hydroxy and alkoxy contents. It is also possible to emphasize the alkoxy functionality of the hydrolysates by conducting the reaction in the presence of an etherifying alcohol.

Accordingly, and in line with conventional organopolysiloxane identification, the preferred organopolysiloxanes have the following unit formula:

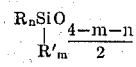

where R is a monovalent hydrocarbon radical, R' is selected from the group consisting of alkoxy radicals and the hydroxyl radical, n has an average value of 1 to 2, and m has an average value of at least 0.1, the sum of m and n being no more than 3, there being an average of at least 1.2 R' groups present per organopolysiloxane molecule.

In the above description the preferred value for m, is from 0.5 to 1.1 and the average number of R' groups per molecule does not exceed 10 and is preferably in the range of 2–8.

Preferred hydrocarbon-substituted polysiloxanes are illustrated by dimethyl triphenyl trimethoxy trisiloxane or hydrolysates of the same which contain from 5–20% by weight of the methoxy group. The base compound can be referred to as having the following average chemical formula:

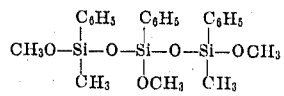

In practice, a compound of the above formula is available with an average molecular weight of 470, a combining weight of 155 and a methoxy content of 20% by weight. This product has a viscosity at 77°F. of 13 centistokes (A-3 on the Gardner-Holdt scale).

Another appropriate product is obtained by hydrolysing the above described trisiloxane to reduce its methoxy content to 15% by weight, which increases its molecular weight until the viscosity at 77°F. is from 60–120 centistokes (B to E on the Gardner-Holdt scale).

Especially preferred is a compound having the formula:

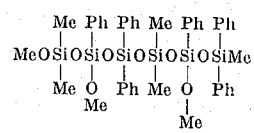

in which Ph identifies the phenyl group and Me the methyl group. This structure contains a plurality of methoxy groups per molecule and has a weight percent methoxy of 13.9%. This compound is referred to in the Examples presented hereinafter as "Siloxane Z."

The proportion of siloxane in the resin condensate may vary considerably, but the presence of the siloxane can be noticed when as little as 1% by weight is present. Preferably, larger amounts are used from 2% up to about 30%, but normally proportions of from 3% to 20% are used.

The proportion of silicon containing material can also be related to the hydroxy content of the copolymer. The silicon-containing material is reacted with the hydroxy group which may be present in either the monomer or the copolymer in order to form a condensate in which the hydrophobic nature of the silicon-containing material is submerged in a copolymer dominated by hydrophylic groups. This requires a copolymer of proper character as explained hereinbefore and unreacted hydroxy groups in the copolymer. While the silicon-containing material must be condensed sufficiently to fully incorporate it in the desired product, it will still contain unreacted acidic silicon OH or alkoxy groups carried by the residue of the silicon-containing material in the condensate. Since condensation may take place with the monomer or the polymer, and since more hydroxy monomer can be used and more hydroxy groups generated by reaction of epoxide with acid after condensation, the most accurate description of the siloxane content and the hydroxy content will relate these to the final resin condensate. These have each been defined hereinbefore. While one can broadly indicate that from 5–95% of the silicon-carried OH or alkoxy groups must be reacted, preferably from 10 to 90% (this being easily noted by measuring the water or alcohol eliminated during the reaction), the extent of reaction is of secondary significance so long as the silicone material is fully incorporated. The condensate should not be advanced to the point of gelation and the final condensate must include both unreacted copolymer OH groups and acidic silicon OH or alkoxy groups.

The condensation reaction between the siloxane and the hydroxy group is carried out at a temperature ranging from 250° to 350° F. Ordinarily it is preferred to conduct the reaction under a reduced pressure in order to speed the removal of the volatile product of the reaction, e.g., water in the case of an hydroxy siloxane and alcohol in the case of an alkoxy siloxane.

It is desirable in the condensation reaction to employ a catalyst which facilitates the reaction. Organic acids, such as naphthenic acid and organic titanates, such as tetrabutyl titanate, are useful for this purpose. The use of the catalyst is not essential, but it does facilitate the condensation reaction and is helpful.

As stated hereinbefore, the siloxane can be first condensed with an unsaturated hydroxy compound to form an unsaturated ether which is then copolymerized with other unsaturated monomers to form the siloxane modified resin. Alternatively, the unsaturated hydroxy-functional monomers can be copolymerized with the other unsaturated monomers and later condensed with the siloxane. This latter method should not be used when alcoholic solvents are used in the polymerization step since the hydroxy groups on the solvent compete with the hydroxy groups on the polymer for reaction with the hydroxy or alkoxy groups of the siloxane.

In either reaction sequence, the addition polymerization is carried out in solution under conditions which produce a copolymer of relatively low molecular weight so as to ease the subsequent dispersion in water and also to make the polymer highly reactive to promote subsequent cure.

The molecular weight of the copolymer is broadly controlled by the fact of solution polymerization, by the utilization of oxygen containing water miscible organic solvents and by the proportion of hydroxy containing monomer that is used, and it is therefore unnecessary to utilize the normal techniques for minimizing molecular weight, e.g., mercaptans, high polymerization temperatures, hig proportion of catalyst and low solids content. Of course, if it is desired to enhance water dispersibility for further minimizing molecular weight, this can always be done by using the normal chain terminating techniques such as those noted above. In preferred practice, the alkoxy siloxane is condensed with an hydroxy functional ethylenically unsaturated material, such as an unsaturated polyester. This is followed by solution copolymerization with other vinyl monomers including a proportion of monoethylenically unsaturated carboxylic acid. The organic solvent is selected for water miscibility and includes a significant proportion of alcoholic solvent. Additional hydroxy functionality is imparted to the resin by reacting a stoichiometric deficiency of monoepoxide with the carboxy groups of the copolymer in the presence of alkaline catalyst to form hydroxy ester groups.

After preparation, the resin containing the siloxane condensed therein is dispersed in water with the aid of alkaline materials, preferably a nitrogenous base.

The specific nature of the nitrogenous base which is selected to aid solubility is not a primary feature of the invention. Ammonia is a useful nitrogenous base, but aliphatic amines are preferred. these aliphatic amines are illustrated by monomethyl amine, dimethyl amine, diethyl amine, triethyl amine and morpholine. The proportion of the nitrogenous base is determined by the pH which is desired in the electrodeposition bath.

The resins used can be applied clear or pigmented. The examples herein deposit clear films to minimize extraneous factors. In normal practice, these resins are frequently pigmented, the pigment being conveniently incorporated in the water free resin solution. Normal pigmentation is illustrated by titanium dioxide rutile incorporated by simple ball milling. A typical pigment to binder ratio is substantially 0.4:1, through this ratio may vary from 0.1:1 to 1:1 with values of 0.3:1 to 0.5:1 being more usual. The only caution to be observed is to avoid those pigments which are unduly sensitive to water.

The acidic hydroxy functional resins containing condensed siloxanes can be cured by themselves, but a superior cure can be obtained in combination with aminoplast resins. The term "aminoplast resins" is a common one used to define heat-hardening condensation products of amines and especially triazines with excess formaldehyde. Condensation products of excess formaldehyde with melamine, benzoguanamine, and urea constitute typical aminoplast resins and the hydrophylic resins of the invention exhibit good compatibility with such materials. The condensation reaction, as is well known, is normally carried out in alcoholic solvent medium, such as methanol, ethanol, butanol or higher alcohol. Broadly, the aminoplast helps the cure when used in proportions of 1–40%, preferably 5–30%, based on total resin, and these are frequently used to form films which cure more extensively and at lower temperature. In this curing reaction, the acidity conferred by the siloxane component is helpful to catalyze the cure.

Unfortunately, and as is known, the simultaneous electrophoretic deposition of acidic resin soaps and aminoplast resins is difficult because the two different resins do not electrodeposit at the same rate. A feature of the invention is the finding that the low acid number hydroxy-functional hydrophylic resins have an affinity for water insoluble aminoplast resins despite the presence of the siloxane component so that, when the hydroxy-functional resins of the invention are electrodeposited, they carry with them the aminoplast resin which, and as is well known, enables a most desirable cure to be obtained between the methylol groups of the aminoplast resin and the hydroxy groups of the hydrophylic resin when the deposited coatings are baked to enable the curing reaction to take place. This simultaneous electrodeposition of hydrophylic hydroxy-functional resin and aminoplast resin having an affinity therefor is particularly preferred when the water insoluble heat-hardening aminoplast resins used are benzoguanamine-formaldehyde condensates which have been dispersed in the electrodeposition bath. With these resins, the electrodeposition is substantially proportional to the concentration of the respective resins in the electrodeposition bath.

Electrodeposition is particularly intended for the deposition of thin films. The materials of lower acid number used in the invention enable thinner films to be produced at the high voltages which are preferred. Moreover, the water insoluble aminoplast resins which are used, e.g., the benzoguanamine-formaldehyde condensates which are preferred, enable a further reduction in film thickness and the films which are deposited outstandingly resist breakdown at high voltage whether an aminoplast component is included or not. Apparently, those aminoplast resins which have sufficient affinity for water to permit them to be dispersed without a hydrophylic resin increase film conductivity and transport can be quite poor. In the invention, the water insoluble aminoplast is forced to follow the hydrophylic resin because of its lack of affinity for water and, this same lack of affinity for the conductive amino-containing aqueous phase of the electrocoating system minimizes the conductivity of the films which are deposited.

An aqueous electrocoating bath would normally contain from 4 to 20% resin solids and more usually from 5 to 15% of resin solids.

The hydrophilic resins of the invention are desirably supplied to the electrocoating bath in the form of a solution in water miscible organic solvent, these being preferably used in an amount of at least 12% by weight, desirably at least 20% by weight of water miscible organic solvent, based on the weight of the resins which are dispersed in the water phase. The solvents which are appropriate have been identified hereinbefore.

The aqueous systems of the invention are used in an electrodeposition process in which a unidirectional electrical current is passed through the bath to cause deposition on the anode. For such purpose, the dispersion in water is preferably formulated to contain 5–15% solids content in water. The pH of the bath can vary widely, e.g., from a pH of 6 or higher. As previously indicated, the prior art use of hydrophobic resins which are dispersed in water through salt formation has been restricted to a pH not in excess of 8.4 whereas, the invention permits the deposition bath to function at higher pH which is helpful to the throwing power of the system. However, one of the main factors which limits throwing power is the voltage used for electrodeposition. The higher the voltage, the better the throwing power. On the other hand, the maximum voltage which can be tolerated is limited by the conductivity of the film which is deposited. The films deposited by the invention are more highly resistive and better resist gassing at high voltage. This increased resistivity to gassing persists when a pH above 8.4 is used so that throwing power can be effectively increased either by the utilization of higher voltage or by the utilization of high pH or both.

Indeed, the invention performs especially well at a pH of 8.5 and higher, a pH of up to about 10 being practical, but preferably it is less than 9.6. Best results are obtained at pH 8.6–9.4.

The preferred water insoluble aminoplast resins are based on benzoguanamine. These are heat-hardening water insoluble condensates of benzoguanamine with a stoichiometric excess of formaldehyde and are, per se, well known. While these do not disperse well in water, per se, they do disperse in the presence of the hydrophilic resins of this invention in water soluble salt form. Conveniently, the benzoguanamine resin is dissolved in the solvent solution of acidic resin (regardless of the presence or absence of base) in water miscible solvent which is added to the aqueous alkaline electrodeposition bath. As a result, the benzoguanamine resin is stably dispersed in the bath by simple mixing. An appropriate commercially available water insoluble heat-hardening benzoguanamine-formaldehyde resin in Uformite QR-366, a product of Rohm & Hass Company. Surprisingly, the two resins may be electrically transported together and without either of the resins significantly building up or becoming depleted in the electrophoretic bath, one with respect to the other.

The films deposited in accordance with the invention are baked to cure the same. In the absence of an aminoplast resin, baking temperatures of approximately 350°F. and higher are desirably used in order to achieve a measure of cure by reaction between the carboxyl and hydroxy functionalities present in the resin. The residual hydroxy and alkoxy groups of the siloxane also participate in the cure. In the presence of an aminoplast resin, the baking temperatures which may be used are lowered and in some instances a satisfactory cure can be obtained at a temperature as low as 200°F. In general, a given degree of cure can be obtained at a temperature of from 10–50% F. lower when the aminoplast resin is present. Appropriate baking temperatures are from 200 to 500°F. for periods varying from about 30 seconds at the highest baking temperatures to about an hour at the lowest temperatures.

The invention will be more fully described by the examples which follow:

Example I

Preparation of Unsaturated Siloxane Ether

Part A: Unsaturated Polyester Resin

| Parts by Weight | | |
|---|---|---|
| 2700 | Trimethylol propane | Heat to 170° F. |
| 940 | Isophthalic Acid | Add and reheat to 390–400° F. Hold for acid value of |
| 30 | Xylol | 59–60 while collecting water of esterification in a |
| 30 | 2-Ethoxy Ethanol Acetate | Dean-Stark trap. |
| 730 | Adipic Acid | Add. Heat to 420° F. and hold for acid value of |
| 600 | Isophthalic Acid | 10–12 |
| 60 | Maleic Anhydride | |
| 2700 | 2-Ethoxy Ethanol Acetate | Add 2 ethoxy ethanol acetate to adjust solids |

Final Characteristics of Unsaturated Polyester:

| | |
|---|---|
| Solids (percent) | 61 |
| Viscosity (Gardner) | V |
| Color (Gardner-Holdt) | 1 |
| Acid Value | 10.5 |

Example 1—Continued

Part B: Preparation of Unsaturated Siloxane Ether

| Parts by Weight | | |
|---|---|---|
| 1920 | Unsaturated Polyester of Part A (61% solids) | Charge into reactor. Heat to 250–260° F. using nitrogen sparge. Collect Methanol with Dean-Stark trap. Hold for viscosity of T-V at 53–55% solids (101 ml. methanol recovered) |
| 624 | Siloxane resin "Z" containing 15% Methoxy | |
| 624 | 2-Ethoxy Ethanol Acetate | |
| 2.4 | Tetrabutyl Titanate | |
| 60 | n-Butyl Alcohol | Cool to 85° C and add |

| Final Characteristics of Siloxane Ether | |
|---|---|
| Solids (percent) | 55.2 |
| Viscosity (Gardner) | V |
| Color (Gardner-Holdt) | 2 |

Example 2

Preparation of Silicone Modified Water-Soluble Acrylic Interpolymer

| Parts by Weight | | |
|---|---|---|
| 500 | 2-Butoxy Ethanol | Charge into reactor. Heat to 140–150° C. |
| 400 | Unsaturated Siloxane Ether of Example I | |
| 200 | 2-Butoxy Ethanol | Premix. Add over 2 hours Hold for 1 hour |
| 620 | Isobutyl Acrylate | |
| 520 | Ethyl Acrylate | |
| 100 | Styrene | |
| 400 | Hydroxyethyl Acrylate | |
| 140 | Acrylic Acid | |
| 40 | t-Butyl Perbenzoate | |
| 5 | t-Butyl Perbenzoate | Add. Hold for 2 hours |
| 5 | t-Butyl Perbenzoate | Add. Hold for 2 hours, Cool |
| 25 | Triethyl Amine | Add when temperature is below 100° C. |
| 370 | Tertiary Glycidyl Ester A | Add. Heat to 130–140° C Hold to acid value 19–21 |

| Final Characteristics of Interpolymer | |
|---|---|
| Resin Solids (percent) | 66.57 |
| Viscosity (Gardner) | $Z_4$ |
| Color (Gardner-Holdt) | 6–7 |
| Acid Value | 21.06 |

The resin solution described above is easily placed in aqueous dispersion by simply stirring the same in water together with added amine or other base. By using sufficient water to reduce the solids content to 50% by weight and with the addition of sufficient triethyl amine to provide a pH of 9.0 in the solution, a stable water dispersion is produced by simple vigorous agitation. This dispersion is directly useful as an aqueous coating. The dispersion (a colloidal sol) is simply brushed or sprayed on a base to form a film which cures on baking for 20 minutes at 400° F. to a solvent resistant, continuous film.

The dispersion of this example is preferably used in conjunction with aminoplast resin. To illustrate use as aqueous coating, the dispersion is mixed with hexamethoxymethyl melamine, in proportions of 10 parts of a 50% solids solution of the melamine resin dissolved in water to 100 parts of the resin dispersion. The deposited films of this mixture of resins cure more rapidly and at lower temperatures; i.e., at 350° for 10 minutes, to provide harder films having excellent solvent resistance.

The following will illustrate electrodeposition of the resins of the invention.

The coating operation is performed in a metal tank, which is equipped with a recirculating pump and a thermometer. The tank serves as a cathode and zinc phosphate treated steel panels or aluminum panels are utilized as the anodes.

The volume of the bath is 2 liters. Direct current is imposed on the metal container (cathode) and on the panels (anode) from an external circuit. Panels 4 inches wide and 8 inches dipped length are used as the anodes for coating.

The voltage across the bath is run up from zero to the voltage desired (maximum of 550 volts) during panel coating to deposit a film, before electrical resistance of the film virtually stops deposition at the maximum voltage used. The deposited film, even before baking, is water resistant, slightly tacky and has very good adhesion to metal. The current details are tabulated hereinafter.

The resins of the invention are used in the form of solutions in water miscible organic solvent and dispersibility in water is achieved using a base, preferably an amine.

The resin in the solution of Example 2 is partially amine satisfied, but more amine is used to facilitate the production of a stable aqueous dispersion. For continuous operation, an amine deficient material is frequently required to replenish the solids deposited from the bath and the Example 2 solution is useful for this purpose. If desired, the partially neutralized acidic product can be dispersed in water to form an aqueous concentrate having a resin solids content of 25–60% and this aqueous concentrate can be used to replenish the solids consumed by electrodeposition to prevent the build up of base in the bath.

After baking for 20 minutes at 400° F., the films cure to a solvent resistant, pore free, hard and flexible coating.

Evaluation of Example 2 in Electrocoating

A clear Formulation, using the solution of siloxane modified acrylic interpolymer of Example 2, is made by thoroughly mixing:

| | |
|---|---|
| Acrylic Interpolymer solution (66% resin solids) | 420 grams |
| Triethyl Amine | 4 grams |
| Deionized Water | 3076 grams |

The above formulation has a solids content of approximately 8% and pH of 8.8. It is subjected to a direct current at various potentials to electrodeposit a film of clear resin at the anode. The results are tabulated below.

| | A | B | C | D |
|---|---|---|---|---|
| Voltage | 50 | 100 | 150 | 200 |
| Initial Amps | 0.6 | 1.6 | 2.3 | 3.0 |
| Final Amps | 0.08 | 0.2 | 0.35 | 0.8 |
| Time (minutes) | 1 | 1 | 1 | 1 |
| Coulombs/gram | — | 14.4 | 14.6 | 32.4 |
| Film Thickness | 0.9 | 1.4 | 1.8 | 2.2 |

Example 3

Preparation of Unsaturated Siloxane Ether Utilizing Dihydric Unsaturated Alcohol Parts by Weight:

| | | |
|---|---|---|
| 720 | Trimethylolpropane monoallyl ether | Charge into reactor equipped with an agitator, reflux condenser, Dean-Stark trap, and nitrogen inlet tube. Heat to 350° F. and distill off methanol (200 gr.) |
| 1240 | Dimethyltriphenyl tri-methoxy trisiloxane | |
| 10 | Phthalic anhydride | |
| 10 | Maleic anhydride | |

The resulting unsaturated siloxane ether is a light colored viscous liquid having Z viscosity (Gardner)

Example 4

Example 2 is repeated using a corresponding weight of the unsaturated siloxane ether of Example 3 in place of the siloxane ether of Example 1. The ether of Example 3 contains a higher proportion of siloxane so that the proportion of siloxane in the final resin is higher. Aside from the better weather resistance assoicates with an increased siloxane content, the results obtained are approximately comparable with those obtained in Example 2.

Example 5

The Preparation of Unsaturated Siloxane Ether

| Parts by Weight | | |
|---|---|---|
| 751 | Methoxy siloxane (1 Mol) containing 15% of methoxy | Charge into reactor equipped with an agitator, reflux and a Dean Stark trap. Heat to 260° F. and distill off methanol. Collect 45 grams of methanol in trap. |
| 143 | Hydroxy ethyl methacrylate | |
| 0.04 | Hydroquinone | |
| 350 | 2-Ethoxy ethanol acetate | |
| 1 | Tetrabutyl titanate | |

Example 6

Example 2 is again repeated using a corresponding weight of the unsaturated siloxane ether of Example 5. The results are approximately the same as for Example 4.

Example 7

Preparation of Silicone Modified Water Soluble Acrylic Interpolymer

| Parts by Weight | | |
|---|---|---|
| 700 | Dioxane | Charge into reactor Heat to 100–110° C. |
| 620 | Isobutyl Acrylate | |
| 150 | Dioxane | Premix and add over 2–2½ hours at 100–110° C. Hold for 1 hour |
| 520 | Ethyl Acrylate | |
| 100 | Styrene | |
| 400 | Unsaturated Siloxane Ether of Example 1 | |
| 400 | Hydroxyethyl Acrylate | |
| 140 | Acrylic Acid | |
| 40 | Tert butyl perbenzoate | |
| 150 | 2-Ethoxy ethanol | Add solvent Add catalyst |
| 5 | Tert butyl perbenzoate | |
| | | Hold for one hour Add catalyst Hold for 2 hours |
| 5 | Tert butyl perbenzoate | |
| 12 | Triethyl Amine | Add Hold for acid value 23–24 |
| 82 | Propylene Oxide | |

Final Characteristics

| | |
|---|---|
| Solids (percent) | 62.8 |
| Viscosity (Gardner) | $Z_6+$ |
| Color (Gardner-Holdt) | 1 |
| Acid Value | 23.5 |

The aqueous electrocoating bath described above can also be used to simultaneously electrodeposit an aminoplast resin. This is done by mixing the aminoplast resin in the form of a 50% organic solvent solution into the acrylic interpolymer solution before dispersion in water. If desired, conventional water dispersible melamine formaldehyde condensates such as the American Cyanamid product XM-1116 (recommended for electrocoating) may be used in an amount of 10% based on the total weight of resin solids and acceptable results can be obtained in this way since the aminoplast resin deposited with the acrylic resin aids the cure to make it take place more rapidly and extensively and at lower temperature. However, it is preferred to use the same amount of benzoguanamine-formaldehyde condensate and, in this way, to form thinner and more resistive films with more proportional deposit of the aminoplast and with better tolerance for high voltage deposition.

The benzoguanamine resin used is a water-insoluble, heat-hardening condensate of benzoguanamine with a stoichiometric excess of formaldehyde. The product is produced by reacting 750 grams of n-butyl Formcel (40% formaldehyde, 51.5% n-butanol and 8.5% water), 630 grams benzoguanamine, and 412 additional grams of n-butanol. The mixture is heated with agitation to 195–200° F. which is maintained for 10–15 minutes until all of the benzoguanamine has dissolved. The pH is adjusted to 4.3–4.5 using a 10% aqueous formic acid solution (approximately 50 milliliters are needed). The temperature is then raised to 203–206°F. to distill n-butanol which is returned as reflux until water (not returned) is no longer generated. After water is no longer generated, butanol is collected in an amount equal to the volume of water which had been collected. The product is then thinned with 310 grams xylene and 135 grams n-butanol and is filtered and then adjusted to 60% nonvolatile solids using a 50/50 weight ratio mixture of xylene and n-butanol.

Example 8

Acrylic Hydroxy Intermediate for Silicone Modification

Charge Composition (Parts by Weight)
- 450 2-Butoxy Ethanol—Heat solvent to 130°C.
- 260 Hydroxyethyl Acrylate
- 1075 Butyl Acrylate
- 170 Acrylic Acid
- 60 Tertiary dodecyl mercaptan
- 985 Styrene
  Premix the above and add to the reactor over a three hour period at 130–133°C.
- 150 2-Butoxy Ethanol
- 50 Tertiary Butyl Perbenzoate
  Add the above catalyst solution simultaneously with premixed monomers over three hour period to reactor. Hold one hour.
- 5 Tertiary Butyl Perbenzoate—add, hold 1 hour.
- 5 Tertiary Butyl Perbenzoate—add, hold 1 hour.
- 650 2-Butoxy Ethanol—Cool and thin with solvent to provide a product having the following final characteristics:

| | |
|---|---|
| Solids: | 67.5% |
| Viscosity (Garner-Holdt) | $Z_4 - Z_5$ |
| Color (Gardner) | 1 |
| Acid Value (nonvolatile) | 49.4 |

Example 9

Preparation of Siloxane-Acrylic Condensate

Charge 800 parts by weight of hydroxy acrylic interpolymer solution of Example 8 (67.5% solids) and 240 parts by weight of methoxy functional polysiloxane intermediate, (100% nonvolatile solids, 8% methoxy content by weight)[1] into a reactor equipped with an agitator, nitrogen inlet tube, and empty Dean-Stark trap. Heat to 140°C. and collect methanol in trap. When 14 cc. of methanol are collected, cool to 90°C. and add 110 parts by weight of isopropanol to provide a condensate having the following final characteristics:

| | |
|---|---|
| Actual solids: | 69.6% |
| Theoretical solids: | 68.7% |
| Gardner-Holdt Viscosity | Y–Z |
| Color (Gardner): | 1 |
| Acid value (resin solids) | 31.1 |
| Ratio of Siloxane to Acrylic Resin: | 30%/70% |

[1](Union Carbide Y–5721 may be used)

In the above Example 9, a polysiloxane having the formula of siloxane Z referred to hereinbefore and a methoxy content of 15% by weight can be used to provide corresponding results. A commercially available product of this type is Union Carbide R-860.

The solution products of Examples 8 and 9 were pigmented with titanium dioxide, dispersed in water with amine as described in the evaluation of Example 2, together with 30%, based on the total weight of resin, of water dispersible melamine-formaldehyde condensate (XM-1116). Coatings were electrodeposited from the bath so-provided onto zinc phosphate treated steel panels. The coated panels were then baked 20 minutes at 375°F. and were tested to provide the results tabulated hereinafter.

| | Example 8 (No silicone) | Example 9 (30% silicone) |
|---|---|---|
| Deposition Voltage | 100 | 100 |
| Film Thickness | 0.7 mil | 0.75 mil |
| Gloss | 47 | 86 |
| Direct Impact inch/lb. | Failed 40 in/lb. | Passed 60 in/lb. |
| Pencil Hardness | 2H | 1H–2H |
| Solvent Resistance | Pass 50 methyl ethyl ketone rubs | Pass 50 methyl ethyl ketone rubs |
| Weathering Test[2] (Exposure for 515 hours) | | |
| Chalking | Trace | None |
| Gloss Retention | 38% of 47 | 100% of 86 |

[2]The weathering test is a conventional one conducted in a twin arc weatherometer in which the specimen is subjected to ultraviolet light exposure in combination with a periodic water spray. The ultraviolet light is supplied by enclosed violet carbon arcs using 102 minutes of light only followed by 18 minutes of light and water spray.

The invention is defined in the claims which follow.

I claim:
1. A method of electrodepositing on the anode a film characterized by improved gloss and weather resistance from an aqueous bath comprising passing a unidirectional electrical current through an aqueous bath having dispersed therein an aminoplast resin in admixture with a solution addition copolymer having at least 1% of organopolysiloxane condensed therein, said copolymer having an acid value of from 12 to 100, an hydroxy value of at least 10 and the major weight proportion of the copolymer consisting of monomers containing a single

group to provide a copolymer which is essentially linear, said organopolysiloxane containing an average of at least 1.2 silicon OH or alkoxy groups per molecule and being condensed with hydroxy groups to eliminate from 50 to 95% of the water or alcohol of reaction from the silicon OH or alkoxy groups and thereby incorporate the same into said copolymer in the form of an ether, said aminoplast resin being present in an amount of from 1 to 40% by weight, based on total resin, said aqueous bath having a solids content of from 4 to 20% by weight and containing at least 12% of water miscible organic solvent, based on the weight of said resin, and said addition copolymer being dispersed in said aqueous bath in the form of a salt of said copolymer with a base, whereby said current will deposit a water insoluble film of said copolymer and said aminoplast on said anode, and baking said film to cure the same whereby the siloxane content of said addition copolymer will enhance the gloss and exterior durability of the electrodeposited film.

2. A method as recited in claim 1 in which said copolymer comprises a major weight proportion of copolymerized $C_1 - C_4$ ester of acrylic acid.

3. A method as recited in claim 1 in which said copolymer having organopolysiloxane condensed therein contains from 2 up to about 30% by weight of said organopolysiloxane.

4. A method as recited in claim 1 in which said copolymer contains from 3 to 30% of the hydroxyl supplying component, based on the weight of the copolymer, calculated on the amount of hydroxy functional unsaturated monomer which would provide the same hydroxyl content.

5. A method as recited in claim 4 in which said hydroxy functionality is provided by reaction of monoepoxide with carboxyl groups in a copolymer formed by copolymerization of monomers including a monoethylenically unsaturated carboxylic acid.

6. A method as recited in claim 4 in which said hydroxy value is up to about 200.

7. A method as recited in claim 1 in which said organopolysiloxane is condensed to eliminate from 10 to 90% of the water or alcohol of reaction.

8. A method as recited in claim 1 in which said copolymer contains from 3 to 50% by weight, based on the weight of the copolymer, of copolymerized ethylenically unsaturated carboxylic acid providing carboxyl functionality in the copolymer, a portion of said carboxyl functionality being reacted with a stoichiometric deficiency of monoepoxide.

9. A method as recited in claim 8 in which said carboxylic acid is incorporated in said copolymer in an amount of from 5 to 30% by weight, and said monoepoxide is selected from the group consisting of ethylene oxide, propylene oxide, butylene oxide, glycidyl esters of tertiary monocarboxylic acids, and mixtures thereof.

10. A method as recited in claim 1 in which said water miscible organic solvent is present in an amount of at least 20 parts per 100 parts of said resin.

11. A method as recited in claim 1 in which said aminoplast is a heat-hardening water insoluble benzoguanamineformaldehyde condensate.

12. A method as recited in claim 1 in which said organopolysiloxane has the formula:

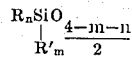

where R is a monovalent hydrocarbon radical, R' is selected from the group consisting of alkoxy radicals and the hydroxyl radical, $n$ has an average value of 1 to 2, and $m$ has an average value of at least 0.1, the sum of $m$ and $n$ being no more than 3, there being an average of at least 1.2 R' groups present per organopolysiloxane molecule.

13. A method as recited in claim 12 in which said organopolysiloxane is methoxy functional.

* * * * *